Figure 1:
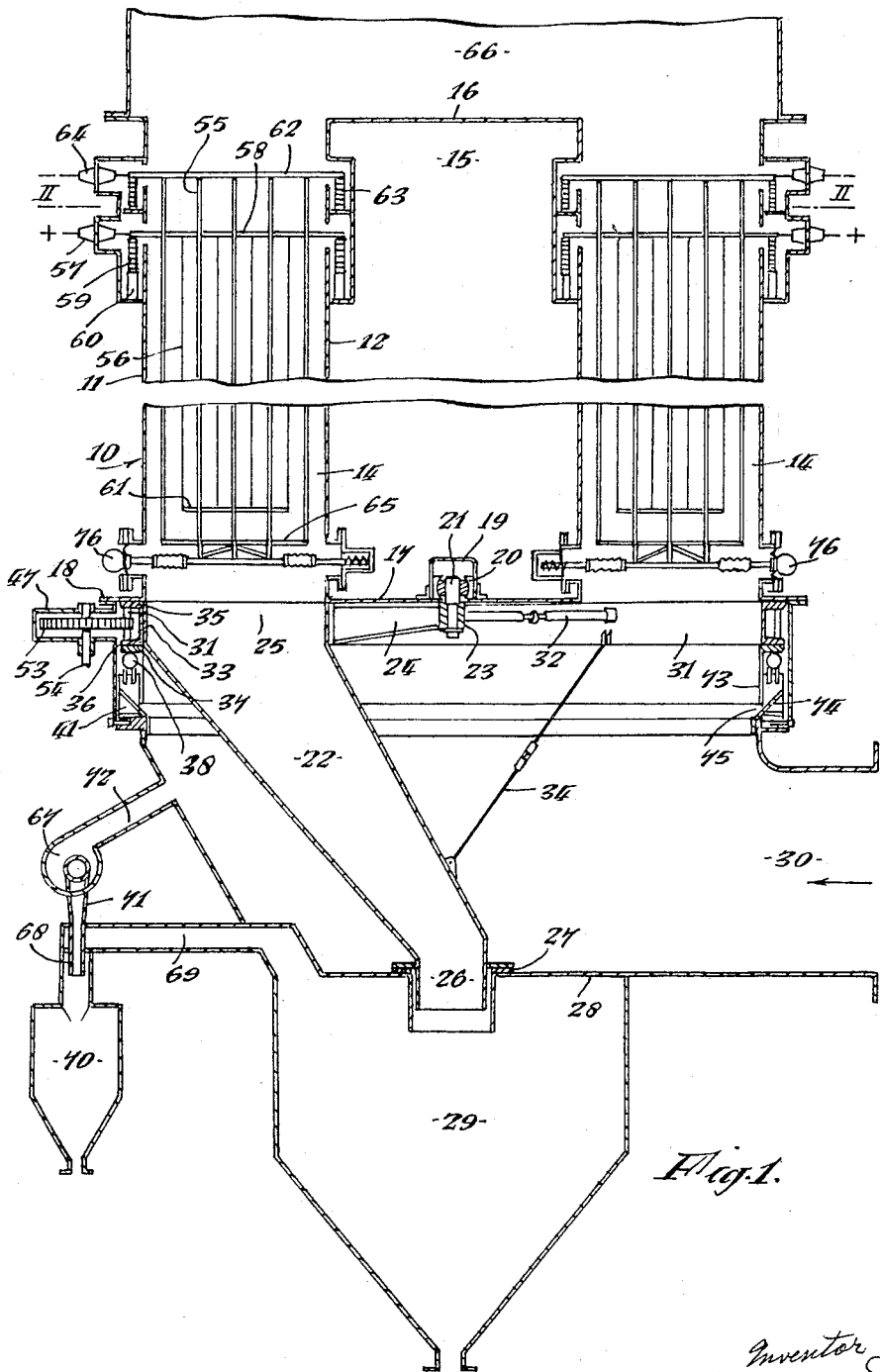

Sept. 27, 1966 H. BRANDT 3,274,753
ELECTROSTATIC PRECIPITATORS
Filed May 28, 1964 3 Sheets-Sheet 1

Inventor
Herbert Brandt
by Albert Jacks
Attorney

Sept. 27, 1966 H. BRANDT 3,274,753
ELECTROSTATIC PRECIPITATORS
Filed May 28, 1964 3 Sheets-Sheet 2

Inventor
Herbert Brandt
by Albert G. Jacobs
Attorney

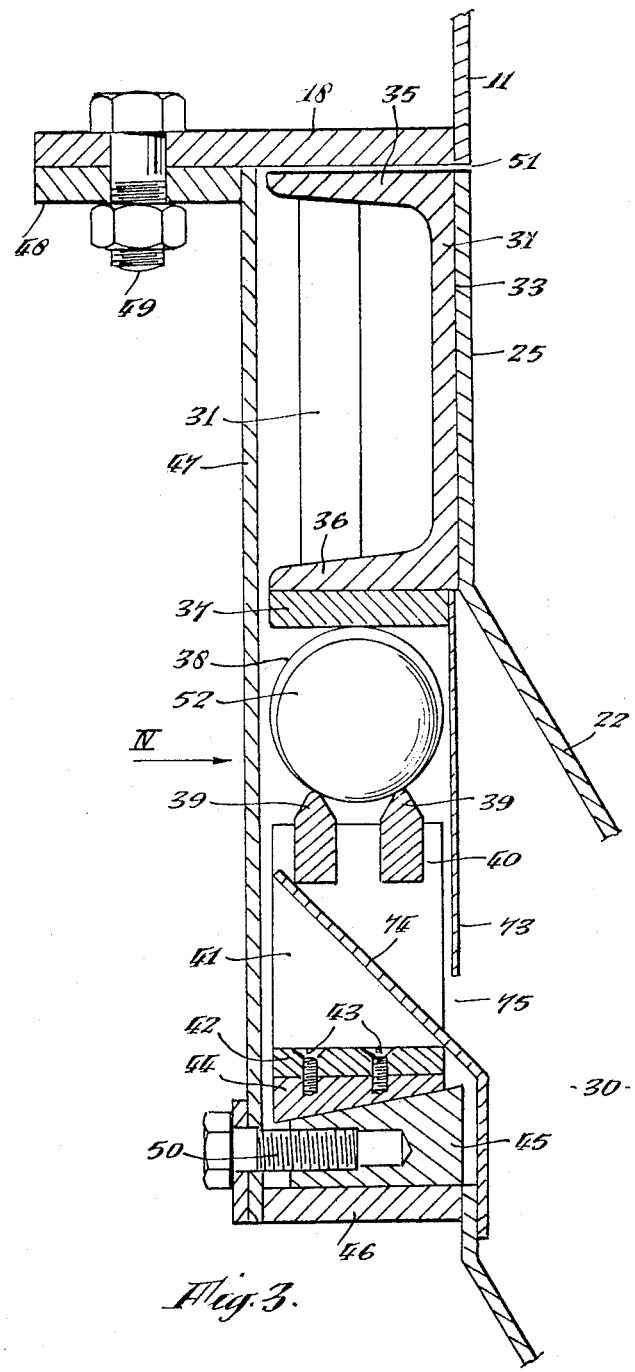

United States Patent Office 3,274,753
Patented Sept. 27, 1966

3,274,753
ELECTROSTATIC PRECIPITATORS
Herbert Brandt, Rothemuhle uber Olpe,
Westphalia, Germany
Filed May 28, 1964, Ser. No. 370,969
7 Claims. (Cl. 55—111)

This invention relates to electrostatic precipitators for the removal of dust from gas, comprising a plurality of vertical chambers disposed adjacent to each other in a circle around a vertical axis, the gas from which the dust is to be removed being caused to flow from a duct through said chambers. Each said chamber is provided with a series of cathodes and anodes providing an electrode system to which high-tension direct current is supplied. The electrodes are in the path of the dust-laden gas which flows through the chambers and the dust adheres to said electrodes, the cleaned gas passing out of the chambers.

Periodically, each chamber, in circular succession, is shut off from the flow of dust-laden gas (the said gas continuing to flow through the other chambers), and during such period the electrodes in the said shut-off chamber have the current switched off from them, either abruptly or in a gradual reduction to zero, and the electrodes are rapped or vibrated to loosen the dust which has collected thereon. The loosened dust descends into a chute which directs the dust into a dust collecting hopper. The chute is disposed at the bottom end of a chamber while it is shut off from the flow of dust-laden gases. The chute is caused to move stepwise around the lower ends of the circle of chambers so as to be disposed below each chamber in succession, and thus to effect the shut-off of a chamber from the flow of dust-laden gas while at the same time providing the means for directing dust to the collecting hopper.

Any fine dust, removed from the electrodes by said rapping or vibration but not capable of falling by its own volition into the collecting hopper, is carried down the chute by a quantity of gas which is admitted to the shut-off chamber at the upper end thereof and is drawn by suction down through the said chamber and the chute into the upper end of the collecting hopper, where it is drawn through a duct into a mechanical secondary dust separator, the said gas being separated therein from the fine dust and returned by a suction fan to the dust-laden gas duct.

An electrostatic precipitator of the kind hereinbefore described is referred to hereinafter as "of the kind referred to."

In a prior construction, disclosed in the specification of my prior patent application Serial No. 96,136, filed March 16, 1961, now Patent No. 3,174,263 dated March 23, 1965, the upper end of the said shut-off chamber is substantially closed by a plate which is caused to move stepwise around the upper ends of the circle of chambers synchronously with the chute at the lower ends of the chambers. The said quantity of gas enters the upper end of the shut-off chamber through leaks between the said plate and the said upper end of the chamber. A gas-tight seal is provided between the bottom end of the shut-off chamber and the upper end of the chute. A vertical drive shaft is provided, coaxially with the circle of chambers, to connect the chute to the plate so that they both move synchronously.

The object of the present invention is to provide improvements in electrostatic precipitators of the kind referred to whereby to simplify the construction and thus reduce the cost, and to increase the operational safety and performance to a considerable degree.

According to this invention in an electrostatic precipitator of the kind referred to the upper ends of the said chambers are open throughout the operation of the apparatus, including the said shut-off period of a chamber, the upper end of the said chute is in close, but not gas-tight relation to the lower end of a chamber when that chamber is so shut-off, and a quantity of gas is drawn into and down a said shut-off chamber through the open top thereof at a velocity which is not more than 50 percent of the velocity of the dust-laden gases flowing through the other chambers.

Figure 2:
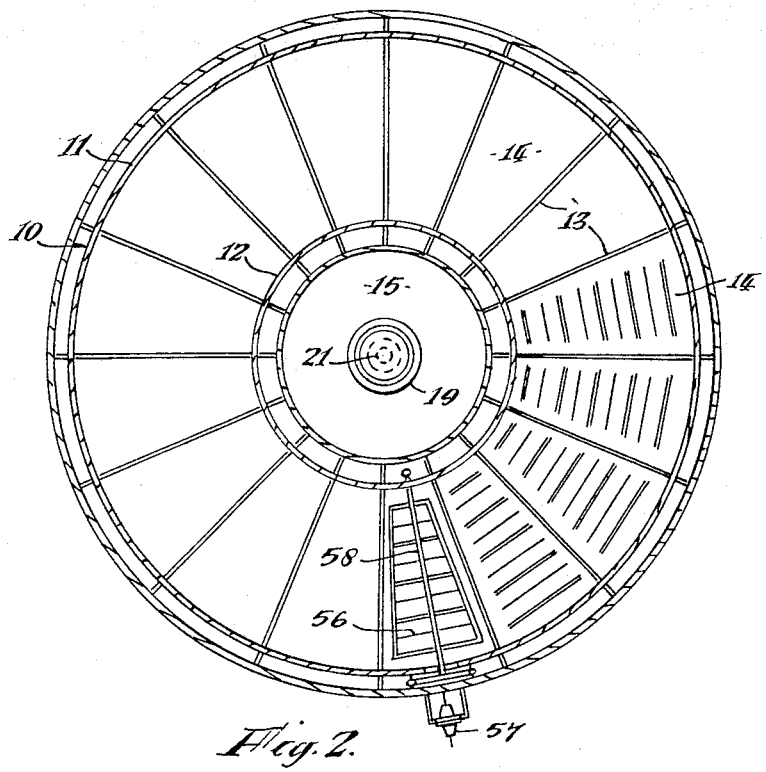
Figure 4:
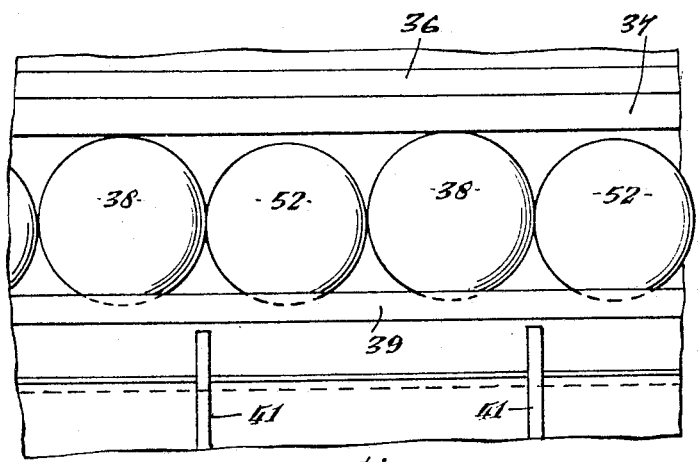

One embodiment of an electrostatic precipitator according to the invention is shown in the accompanying drawings, wherein:

FIG. 1 is a sectional elevation;
FIG. 2 is a sectional plan view taken on line II—II of FIG. 1;
FIG. 3 is an enlarged sectional elevation of a part of the apparatus shown in FIG. 1;
FIG. 4 is a developed side elevation of the part of FIG. 3 indicated by the arrow IV.

The dust collecting plant comprises an annular casing 10 with an outer wall 11, an inner wall 12, and substantially radial walls 13 extending between the outer wall 11 and the inner wall 12 and also extending the full depth of the casing, the radial walls 13 thus dividing the annular casing into sector-shaped chambers 14. The central portion 15 of the annulus formed by the casing is closed at the top end by a plate 16 and at the bottom end by a plate 17. Outside of and on the outer casing wall 11 there is an annular ring plate 18 which is in the same horizontal plane as the plate 17.

A bearing housing 19 in the plate 17, and at the axis of the annular casing, contains a bearing 20 in which is mounted a short vertical spindle 21. The bearing 20 is of the part-spherical kind which will allow the spindle 21 to swivel slightly out of its normal vertical attitude.

A chute 22 is carried below the casing 10 on the spindle 21 by means of a hub 23 and arm 24. The chute 22 has a throat or hood 25 at its upper end which conforms in shape and size to the lower end of a sector-shaped chamber 14, and the said hood is disposed with its open top end close to the undersides of the plate 17 and of the ring 18. The chute 22 also has an open cylindrical bottom end 26 which is axially aligned with the spindle 21 and extends, rotatably, through a sealing gland 27 in the top cover plate 28 of a dust collecting hopper 29.

Between the bottom plate 17 of the casing 10 and the top plate 28 of the hopper 29 there is formed an inlet duct 30 for dust-laden gas to enter the apparatus, the said duct being always open to the bottom ends of the chambers 14 except such chamber as is shut off therefrom by the chute hood 25 as hereinafter described.

An annular pin-rack gear 31 is disposed at the lower end of the casing 10 and is supported from the hub 23 on the spindle 21 by a series of arms 32 (only one of which is shown in FIG. 1) which are adjustable in length, and by attachment, at 33, to the outer face of the hood 25 of the chute 22. An adjustable support arm 34 is also disposed between the gear 31 and the lower portion of the chute 22. The annular gear 31 has an internal diameter equal to the external diameter of the casing outer wall 11. The pin-rack gear 31 has a channel section, having a top horizontal flange 35 which is disposed close to the underside of the ring plate 18, and a bottom flange 36 to which is attached a bearing ring 37. The bearing ring 37 is carried on balls 38 which in turn are carried by and roll on an annular track formed by two concentric rails 39. The rails 39 are carried in recesses 40 in carrier plates 41. The carrier plates 41 are in turn supported by a carrier ring 42 which is secured by studs 43 to the upper wedge element 44 of an adjusting wedge device. The bottom wedge element 45 of the wedge adjusting device, which slides under the upper wedge element 44, is carried by and slides upon the bottom wall 46 of an annular housing 47, which houses the elements 31, 37, 38, 39, 41, 42, 44 and 45. The housing 47 is secured by an upper flange 48 thereon to the ring plate 18 by bolts 49. Studs 50 in the side wall of the housing 47 engage the bottom wedge elements 45 to move the said elements inwardly or outwardly whereby the pin-rack gear 31 may be raised or lowered in order to regulate the dimension of the gap 51 between the ring plate 18 and the top flange 35 of the gear 31 to a desired value. Smaller diameter balls 52 are disposed between adjacent bearing balls 38 to provide spacers for the balls 38. A driving pinion 53 on a driving shaft 54 engages the pin-rack gear 31 to effect rotation of chute hood 25 around the bottom end of the casing 10 as hereinafter described. The pinion 53 is located within the housing 47, and the shaft 54 is driven in a suitable manner by electrical or mechanical means.

Each sector-shaped chamber 14 is provided with a set of electrodes, each set comprising cathodes 55 and anodes 56. The anodes 56 are connected, through insulators 57 (FIG. 1), to the positive pole of a source of high tension electric current, and they are suspended from carriers 58 which are supported by insulators 59 under which rapping or vibrating devices 60 are installed. The bottom ends of the anodes are connected to and spaced from each other by a rail 61.

The cathodes 55 are suspended from carriers 62 which are supported on insulators 63. The cathodes are connected to the negative pole of the high tension supply through insulators 64. The bottom ends of the cathodes are connected to and spaced from each other by rail 65, and are connected to a rapping or vibrating device 76.

By means of the devices 60 and 76 the anodes 56 and cathodes 55 are rapped or vibrated intermittently to remove dust collected thereon; such rapping or vibrating is effected when the chamber containing the electrodes is shut off in the manner hereinafter described and the electric current thereto is switched off or reduced progressively to zero.

The dust-laden gas is introduced into the precipitator through the inlet duct 30 at a regulated velocity and it rises up each chamber 14 of which the bottom end is open to the said duct. The high tension current is switched on to the electrodes in the said chambers and the dust entrained in the gas adheres electrostatically to the electrodes.

Periodically, the assembly comprising the chute 22 and the gear 31 is rotated, by the drive shaft 54 and pinion 53, an angular distance corresponding to the angular spacing between adjacent chambers 14 so that the hood 25 of the chute 22 registers with the bottom end of a chamber 14 and thus shuts off that chamber from the duct 30. Thereupon the high tension current to the electrodes in that chamber is switched off or progressively reduced to zero, and the rapping or vibrating devices 60 in the said chamber are actuated to apply intermittent shocks to the said electrodes. Thereby the dust on the electrodes is dislodged therefrom and descends the chamber into the chute 22 and thence through the outlet 26 into the dust collecting hopper 29.

The fine dust which may remain in suspension in the gas contained in the said shut-off chamber will be entrained in a quantity of gas which is drawn by suction into the said chamber through the open top thereof from the duct 66. The said gas is drawn into the said chamber by a suction pump 67 which applies suction to the upper part of the dust collecting hopper 29 through a secondary mechanical dust separator 68 and a conduit 69. The said gas together with the entrained fine dust enters the separator 68, the dust is separated from the gas and descends into the secondary hopper 70, while the gas returns by way of the separator conduit 71, the pump 67 and a conduit 72 to the duct 30.

The pump 67 is operated to draw gas into the open top end of the shut-off chamber 14 at a velocity of between 10 percent and 50 percent of the velocity of the dust-laden gas upwardly through the other chambers 14 from the duct 30. Such a relatively low pressure suffices to prevent the clean gas from the other chambers entering the shut-off chamber (except the small quantity of gas which is specifically drawn thereinto) instead of passing onwards into and from the clean gas duct 66. Furthermore, such low pressure is insufficient to cause any large quantity of gas to be drawn into the chute 22 through the sealing gap 51 from the duct 30 through the housing 47. The said gap 51 can be regulated, so that the suction applied by the pump 67 does not cause an appreciable quantity of gas to be drawn therethrough, by actuating the wedge element 45.

It will be seen that in an electrostatic precipitator according to this invention there is no need to provide any means for closing the top ends of the chambers 14, and consequently there is no need for a long axially disposed shaft to connect such a closure to the rotary chute, it now being sufficient to have a short spindle 21. Furthermore, there is now no need for complicated sealing devices between the chute hood 25 and the plates 17 and 18 to prevent leakage of gas therebetween.

The ball bearing support 38, 39 is substantially screened from the gas in the duct 30 by a screening plate 73 which depends from the chute 22. Any dust which may intrude into the said bearing will fall between the track rails 39 on to a sloping flashing 74 and thence back into the duct 30 through opening 75.

The assembly of chambers 14 may be circular or polygonal, and the chambers may be of any shape in plan, but in all cases the chambers will be assembled in a circle around an axis which is the axis of rotation of the chute.

FIG. 2 shows an electrode system in only one chamber 14, with a system briefly indicated in some other chambers; however, there is an electrode system in each chamber 14.

The chute may be duplicated, the two chutes being diametrically opposed to each other and being rotatable simultaneously; thereby two diametrically opposed chambers can be shut off from the flow of dust-laden gas simultaneously.

In the embodiment described, the flow of dust-laden gas is upwards from the duct 30 to the duct 66. However, it could well be that the dust-laden gas is caused to enter the duct 66 and flow downwards through the chambers 14 to the duct 30. In that event, the conduit 72 from the pump 67 will lead to the duct 66.

What I claim and desire to secure by Letters Patent is:

1. In an electrostatic precipitator comprising an assembly of a plurality of vertical chambers disposed adjacent to each other in a circle around a vertical axis, dust-laden gas being caused to flow from a duct through the said chambers, each said chamber being provided with an electrode system to which high-tension electric current is supplied, means for periodically shutting off a said chamber from the flow of said dust-laden gas, the flow of current to the electrode system in the said chamber being cut off or progressively reduced during said shut-off period, means for vibrating the said electrode system during said shut-off period to dislodge dust collected on said system, a dust-collecting hopper disposed below the assembly of chambers, and means for directing said dislodged dust into the dust-collecting hopper, the improvement which comprises a chute disposed below the assembly of chambers, said chute having a lower end extending into the dust collecting hopper in axial alignment with the axis of said assembly of chambers and an upper end adapted to register with the bottom end of a chamber, means for rotating the chute periodically and stepwise whereby its upper end registers successively with individual chambers, the spacing between the upper end of the chute and the bottom end of a chamber being close without being gas-tight, the top ends of all of the chambers being uncovered, and means for flowing a gas through a shut-off chamber and the chute in register therewith at a velocity of less than fifty percent of the velocity at which the dust-laden gas flows through the chambers.

2. In an electrostatic precipitator according to claim 1, the further improvement which comprises a ring secured to the upper end of the chute, a plurality of ball bearings supporting the ring, and an annular track comprising two spaced apart and concentric circular rails whose axis is aligned with the axis of the assembly of chambers.

3. In an electrostatic precipitator according to claim 2, the further improvement which comprises alternating the supporting balls with balls of smaller diameter which act as spacers between the supporting balls.

4. In an electrostatic precipitator according to claim 2, the further improvement which comprises means for adjusting the elevation of the supporting ball bearings.

5. In an electrostatic precipitator according to claim 2 the further improvement which comprises means for adjusting the elevation of the supporting ball bearings which comprises a plurality of wedges together with means for moving the wedges.

6. In an electrostatic precipitator according to claim 1, the further improvement which comprises securing the upper end of the chute to an annular gear which is rotatable around the axis of the assembly of chambers, and a drive pinion which engages the gear to effect rotation of the chute.

7. In an electrostatic precipitator according to claim 1, the further improvement which comprises connecting the upper end of the chute to a spindle which is coaxial with the assembly of chambers and which is mounted rotatably in a part spherical bearing.

References Cited by the Examiner

UNITED STATES PATENTS

| | | | |
|---|---|---|---|
| 1,279,949 | 9/1918 | Waterman. | |
| 2,672,947 | 3/1954 | Klemperer | 55—111 |
| 2,701,622 | 2/1955 | Hodson | 55—120 |

FOREIGN PATENTS 939,194  10/1963  Great Britain.

ROBERT F. BURNETT, *Primary Examiner.*